(12) United States Patent
Capps et al.

(10) Patent No.: US 12,333,313 B2
(45) Date of Patent: *Jun. 17, 2025

(54) ENCODING STEREO SPLASH SCREEN IN STATIC IMAGE

(71) Applicant: Magic Leap, Inc., Plantation, FL (US)

(72) Inventors: Marshall Charles Capps, Austin, TX (US); Anuroop Suresh Jesu, Sunnyvale, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,326

(22) Filed: Feb. 23, 2024

(65) Prior Publication Data

US 2024/0202005 A1 Jun. 20, 2024

Related U.S. Application Data

(63) Continuation of application No. 17/110,232, filed on Dec. 2, 2020, now Pat. No. 11,941,408.

(Continued)

(51) Int. Cl.
*G06T 19/00* (2011.01)
*G02B 27/01* (2006.01)
(Continued)

(52) U.S. Cl.
CPC ....... *G06F 9/4401* (2013.01); *G02B 27/0172* (2013.01); *G06T 1/20* (2013.01);
(Continued)

(58) Field of Classification Search
CPC ..... G06F 9/4401; G02B 27/0172; G06T 1/20; G06T 3/4007; G06T 9/00; G06T 13/80; G06T 19/006
(Continued)

(56) References Cited

U.S. PATENT DOCUMENTS 6,850,221 B1 2/2005 Tickle
10,378,882 B2 8/2019 Yeoh et al.
(Continued)

FOREIGN PATENT DOCUMENTS

CN 107689218 A 2/2018
EP 2677419 A1 12/2013
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Gordon G Liu
(74) *Attorney, Agent, or Firm* — Seed IP Law Group LLP

(57) ABSTRACT

During a boot-up processing of a computing device, such as an augmented reality wearable device, a static image and a bootup process progress bar may be encoded in a single image file, such as a bitmap image, and displayed in conjunction with updates that are applied to a hardware gamma table at various stages of the bootup process to create the effect of an animated progress bar.

18 Claims, 14 Drawing Sheets

Related U.S. Application Data

(60) Provisional application No. 62/944,984, filed on Dec. 6, 2019.

(51) Int. Cl.
*G06F 9/4401* (2018.01)
*G06T 1/20* (2006.01)
*G06T 3/4007* (2024.01)
*G06T 9/00* (2006.01)
*G06T 13/80* (2011.01)

(52) U.S. Cl.
CPC .............. *G06T 3/4007* (2013.01); *G06T 9/00* (2013.01); *G06T 13/80* (2013.01); *G06T 19/006* (2013.01)

(58) Field of Classification Search
USPC .......................................................... 713/2
See application file for complete search history.

(56) References Cited

U.S. PATENT DOCUMENTS

| | | | |
|---|---|---|---|
| 2001/0048764 A1 | 12/2001 | Betrisey et al. | |
| 2006/0026429 A1 | 2/2006 | Kudo et al. | |
| 2006/0028436 A1 | 2/2006 | Armstrong | |
| 2007/0076949 A1* | 4/2007 | Kanai | H04N 5/202 382/169 |
| 2007/0081123 A1 | 4/2007 | Lewis | |
| 2008/0303750 A1 | 12/2008 | Ludden et al. | |
| 2010/0141685 A1 | 6/2010 | Lee | |
| 2010/0214310 A1 | 8/2010 | Kuwahara et al. | |
| 2012/0026216 A1 | 2/2012 | Brown Elliott et al. | |
| 2012/0127062 A1 | 5/2012 | Bar-Zeev et al. | |
| 2012/0127320 A1* | 5/2012 | Balogh | H04N 13/363 353/121 |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0132977 A1 | 5/2014 | Takahashi et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2015/0016777 A1 | 1/2015 | Abovitz et al. | |
| 2015/0026719 A1* | 1/2015 | Menon | H04N 21/2668 725/34 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0307540 A1 | 10/2016 | Holland et al. | |
| 2017/0050111 A1* | 2/2017 | Perry | H04L 67/131 |
| 2018/0025543 A1 | 1/2018 | Troy et al. | |
| 2018/0268780 A1* | 9/2018 | Bae | G09G 5/026 |
| 2018/0338057 A1 | 11/2018 | Ito | |
| 2019/0197982 A1 | 6/2019 | Chi et al. | |
| 2019/0287493 A1 | 9/2019 | Neustein | |
| 2019/0335081 A1 | 10/2019 | Baar et al. | |
| 2021/0158745 A1 | 5/2021 | He | |

FOREIGN PATENT DOCUMENTS

| | | | |
|---|---|---|---|
| JP | 2014098747 A | 5/2014 | |
| JP | 2018004703 A | 1/2018 | |
| JP | 2018195943 A | 12/2018 | |

OTHER PUBLICATIONS

Azuma, "A Survey of Augmented Reality," Teleoperators and Virtual Environments 6, 4 (Aug. 1997), pp. 355-385. <https://web.archive.org/web/20010604100006/http://www.cs.unc.edu/~azuma/ARpresence.pdf>.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 <https://web.media.mit.edu/~raskar/book/BimberRaskarAugmentedRealityBook.pdf>.

Extended European Search Report, dated Oct. 27, 2023, for Application No. PCT/US2020062817. (7 pages).

Ham et al., "LPD: Low Power Display Mechanism for Mobile and Wearable Devices," 2015 USENIX Annual Technical Conference, Santa Clara, CA, USA, Jul. 8-10, 2015, pp. 587-598. (13 pages).

International Search Report and Written Opinion, dated Mar. 24, 2021, for International Patent Application No. PCT/US2020/062617. (16 pages).

Jacob, "Eye Tracking in Advanced Interface Design," Human-Computer Interaction Lab Naval Research Laboratory, Washington, D.C. / paper/ in Virtual Environments and Advanced Interface Design, ed. bv W. Barfield and T.A. Furness, pp. 258-288, Oxford University Press, New York (1995).

Tanriverdi et al., "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

Logo Pixel Values

| | | | | | | | | | | | |
|---|---|---|---|---|---|---|---|---|---|---|---|
| 255 | 255 | 0 | 0 | 0 | 0 | 0 | 0 | 0 | 255 | 255 | |
| 255 | 255 | 0 | 55 | 55 | 55 | 55 | 55 | 0 | 255 | 255 | |
| 255 | 255 | 0 | 55 | 155 | 155 | 155 | 55 | 0 | 255 | 255 | |
| 255 | 255 | 0 | 55 | 155 | 205 | 155 | 55 | 0 | 255 | 255 | |
| 255 | 255 | 0 | 55 | 155 | 255 | 155 | 55 | 0 | 255 | 255 | ← 810 |
| 255 | 255 | 0 | 55 | 155 | 255 | 155 | 55 | 0 | 255 | 255 | |
| 255 | 255 | 0 | 55 | 155 | 205 | 155 | 55 | 0 | 255 | 255 | |
| 255 | 255 | 0 | 55 | 155 | 155 | 155 | 55 | 0 | 255 | 255 | |
| 255 | 255 | 0 | 55 | 55 | 55 | 55 | 55 | 0 | 255 | 255 | |
| 255 | 255 | 0 | 0 | 0 | 0 | 0 | 0 | 0 | 255 | 255 | |

FIG. 8A

Interpolate from 0-255 to 0-63 to obtain adjusted pixel values:

| | | | | | | | | | | | |
|---|---|---|---|---|---|---|---|---|---|---|---|
| 63 | 63 | 0 | 0 | 0 | 0 | 0 | 0 | 0 | 63 | 63 | |
| 63 | 63 | 0 | 14 | 14 | 14 | 14 | 14 | 0 | 63 | 63 | |
| 63 | 63 | 0 | 14 | 38 | 38 | 38 | 14 | 0 | 63 | 63 | |
| 63 | 63 | 0 | 14 | 38 | 51 | 38 | 14 | 0 | 63 | 63 | |
| 63 | 63 | 0 | 14 | 38 | 63 | 38 | 14 | 0 | 63 | 63 | |
| 63 | 63 | 0 | 14 | 38 | 63 | 38 | 14 | 0 | 63 | 63 | ← 820 |
| 63 | 63 | 0 | 14 | 38 | 51 | 38 | 14 | 0 | 63 | 63 | |
| 63 | 63 | 0 | 14 | 38 | 38 | 38 | 14 | 0 | 63 | 63 | |
| 63 | 63 | 0 | 14 | 14 | 14 | 14 | 14 | 0 | 63 | 63 | |
| 63 | 63 | 0 | 0 | 0 | 0 | 0 | 0 | 0 | 63 | 63 | |

Overlay: start with 100%, down to 10%; set values <64 to 64

| | | | | | | | | |
|---|---|---|---|---|---|---|---|---|
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |
| 83 | 102 | 121 | 140 | 160 | 179 | 198 | 217 | 236 | 255 |

Overlay composite progress bar data (Fig. 9C) with logo data (Fig 8B) to generate static image data (e.g., a bitmap image file)

Progress Bar encoded Values 904:

| 0 | 0 | 0 | 0 | 0 | 0 | 0 | 0 | 0 | 0 | 0 | 0 |
|---|---|---|---|---|---|---|---|---|---|---|---|
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 83 | 102 | 121 | 140 | 160 | 179 | 198 | 217 | 236 | 255 | 0 |
| 0 | 0 | 0 | 0 | 0 | 0 | 0 | 0 | 0 | 0 | 0 | 0 |

Static Image Encoded Values 820:

| 0 | 0 | 0 | 0 | 0 | 0 | 0 | 0 | 0 | 0 | 0 | 0 |
|---|---|---|---|---|---|---|---|---|---|---|---|
| 0 | 63 | 63 | 0 | 0 | 0 | 0 | 0 | 0 | 63 | 0 | 0 |
| 0 | 63 | 63 | 0 | 14 | 14 | 14 | 14 | 14 | 0 | 63 | 0 |
| 0 | 63 | 63 | 0 | 14 | 38 | 38 | 38 | 14 | 0 | 63 | 0 |
| 0 | 63 | 63 | 0 | 14 | 38 | 51 | 38 | 14 | 0 | 63 | 0 |
| 0 | 63 | 63 | 0 | 14 | 38 | 63 | 38 | 14 | 0 | 63 | 0 |
| 0 | 63 | 63 | 0 | 14 | 38 | 63 | 38 | 14 | 0 | 63 | 0 |
| 0 | 63 | 63 | 0 | 14 | 38 | 51 | 38 | 14 | 0 | 63 | 0 |
| 0 | 63 | 63 | 0 | 14 | 38 | 38 | 38 | 14 | 0 | 63 | 0 |
| 0 | 63 | 63 | 0 | 14 | 14 | 14 | 14 | 14 | 0 | 63 | 0 |
| 0 | 63 | 63 | 0 | 0 | 0 | 0 | 0 | 0 | 63 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

1000 image data with progress bar and logo

FIG. 10

ENCODING STEREO SPLASH SCREEN IN STATIC IMAGE

FIELD

This disclosure relates to virtual reality, augmented reality, and mixed reality imaging and visualization systems.

DESCRIPTION OF THE RELATED ART

Modern computing and display technologies have facilitated the development of virtual reality ("VR"), augmented reality ("AR"), and mixed reality ("MR") systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

Because the human visual perception system is complex, it is challenging to produce a VR/AR/MR technology that facilitates a comfortable, natural-feeling, rich presentation of virtual image elements amongst other virtual or real-world imagery elements.

BRIEF DESCRIPTION OF THE DRAWINGS

FIG. 8A illustrates an example of pixel data associated with a static image that may be displayed during a bootup process.

FIG. 8B illustrates an example of interpolated pixel data associated with the static image of FIG. 8A.

FIGS. 9A and 9B illustrate pixel values transformations applied to various stages of a progress bar as part of an encoding process.

FIG. 9C illustrates an example of encoded pixel values from each of the progress stages of FIGS. 9A-9B overlaid into a single set of encoded pixel values.

FIG. 10 illustrates an example of image data that includes encoded pixel values of the static image (e.g., the square logo) in a lower portion of the image file and the encoded pixel values of the progress bar in an upper portion of the image file.

DETAILED DESCRIPTION

Virtual reality ("VR"), augmented reality ("AR"), and mixed reality ("MR") systems disclosed herein can include a display which presents computer-generated imagery (video/image data) to a user. In some embodiments, the wearable systems are wearable, which may advantageously provide a more immersive VR or AR experience.

Figure 1:
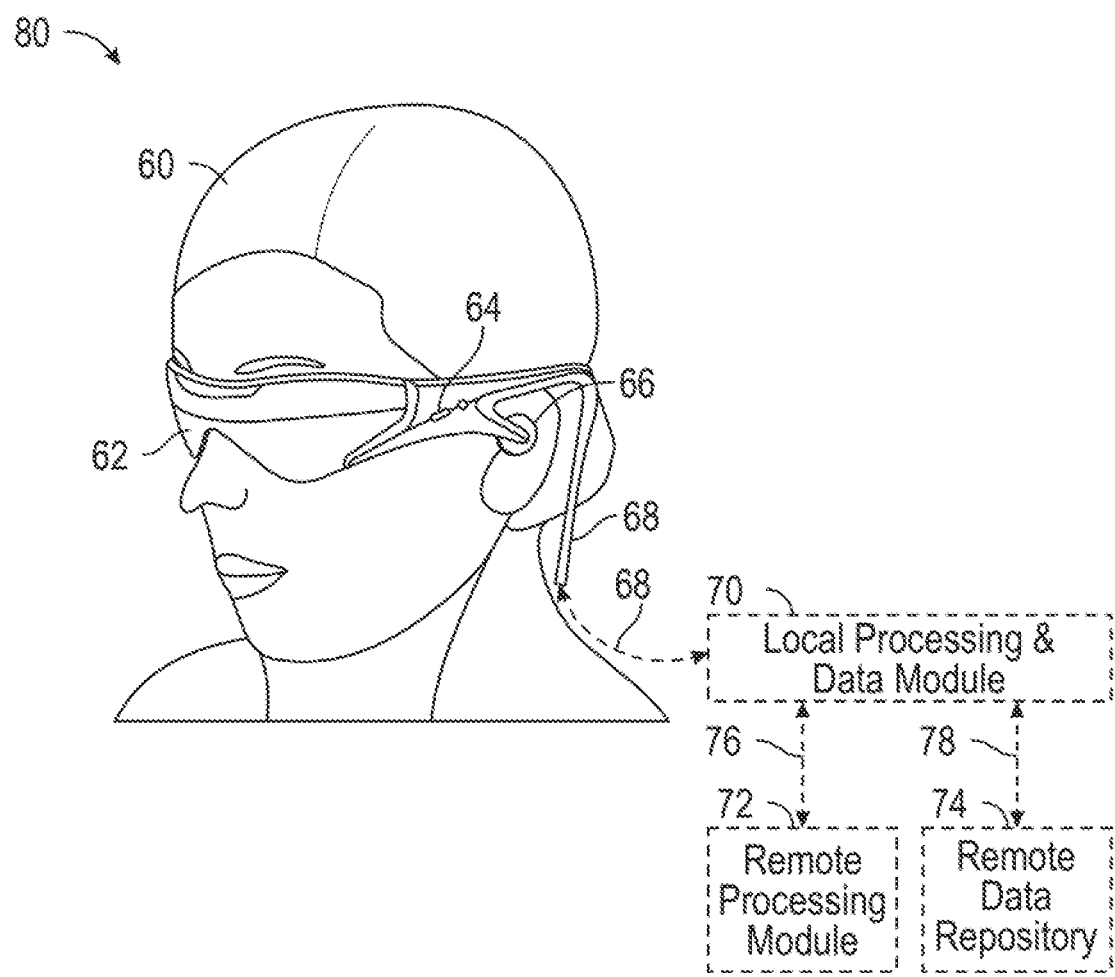
FIG. 1 illustrates an example of a wearable system.

FIG. 1 illustrates an example of wearable VR/AR/MR wearable system 80 (hereinafter referred to as "system 80"). The system 80 includes a display 62, and various mechanical and electronic modules and systems to support the functioning of that display 62. The display 62 may be coupled to a frame 64, which is wearable by a wearable system user or viewer 60 (hereinafter referred to as "user 60") and which is configured to position the display 62 in front of the eyes of the user 60. In some embodiments, a speaker 66 is coupled to the frame 64 and positioned adjacent the ear canal of the user 60. In some embodiments, another speaker, not shown, is positioned adjacent the other ear canal of the user 60 to provide for stereo/shapeable sound control. The display 62 is operatively coupled, such as by a wired or wireless connection 68, to a local processing and data module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration, etc.).

The local processing and data module 70 may include one or more processors such as an application processor (AP) and a graphics processing unit (GPU), as well as digital memory, such as non-volatile memory (e.g., flash memory), both of which may be utilized to assist in the processing and storing of data. Data includes data captured from sensors, such as image capture devices (e.g., cameras), microphones, inertial measurement units, accelerometers, compasses, GPS units, radio devices, and/or gyros. The sensors may be operatively coupled to the frame 64 or otherwise attached to the user 60. Alternatively, or additionally, sensor data may be acquired and/or processed using a remote processing module 72 and/or a remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70.

In some embodiments, the remote processing module 72 may include one or more processors configured to analyze and process data (e.g., sensor data and/or image information). In some embodiments, the remote data repository 74 may include a digital data storage facility, which may be available through the internet or other networking configuration in a "cloud" resource configuration. In some embodiments, all data is stored and all computations are performed in the local processing and data module, allowing fully autonomous use from a remote module.

In some embodiments, the computer-generated image data provided via the display 62 can create the impression of being three-dimensional. This can be done, for example, by presenting stereoscopic image data to the user 60. In some conventional systems, such image data can include separate images of a scene or object from slightly different perspectives. The separate images can be presented to the right eye and left eye of the user 60, respectively, thus simulating binocular vision and its associated depth perception.

Figure 2:
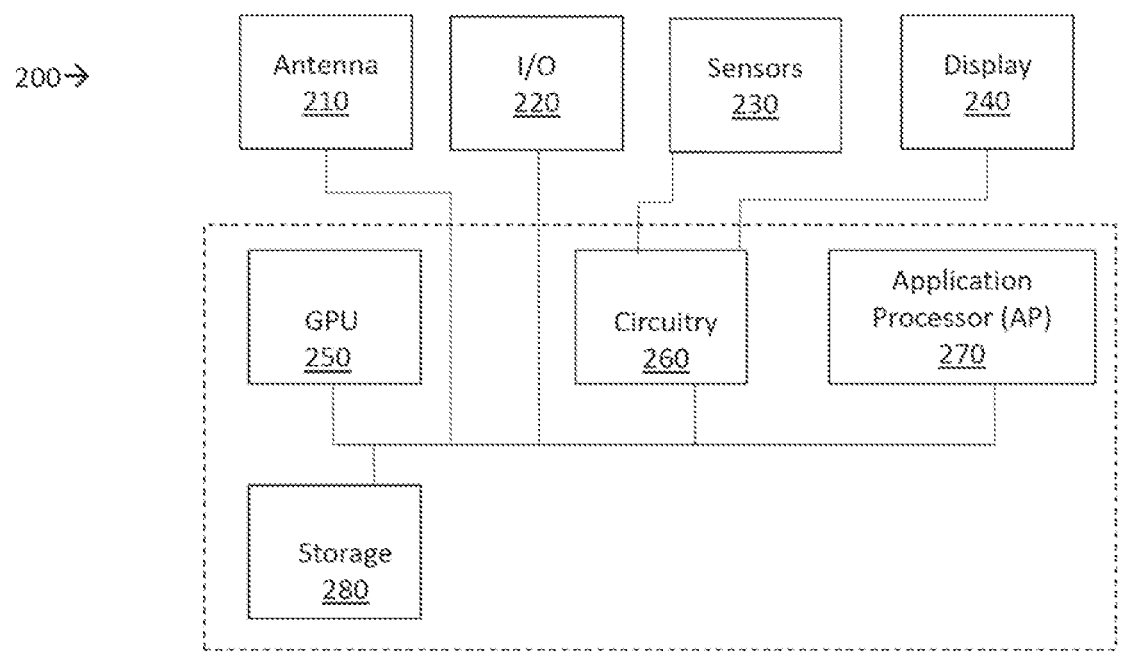
FIG. 2 illustrates a simplified block diagram of a wearable system according to some embodiments.

FIG. 2 illustrates a simplified block diagram of a wearable system 200 according to some embodiments. In this example, the wearable system 200 can include an antenna 210, input-output (I/O) interfaces 220, one or more sensors 230, a display 240, a GPU 250, a control circuitry 260, an application processor ("AP") 270 and storage 280. The antenna 210 may be used for wireless communication with another device such as the remote processing module 72 or the remote data repository 74 (FIG. 1). The user may use the I/O interfaces 220 for interaction with the wearable system. The sensors 230 may include image capture devices (e.g., cameras), microphones, inertial measurement units, accelerometers, compasses, GPS units, radio devices, gyros, and/or other input devices. The display 240 may include one or more graphical displays, such as a left-eye and a right-eye display panel. The display 240 may include a central processing unit (CPU), a GPU and storage.

In the example of FIG. 2, the GPU 250 is configured to render virtual, augmented, and/or mixed reality image data to be displayed to the user 60. The GPU 250 includes graphics pipeline. The control circuitry 260 can be communicatively coupled to the antenna 210, the I/O interfaces 220, the sensors 230, the display 240, the GPU 250, the AP and the storage 280. The control circuitry 260 sends control signals to the antenna 210, the I/O interfaces 220, the sensors 230, the display 240, the GPU 250, the AP and the storage 280.

The AP 270 may include a central processing unit (CPU), storage, GPU, etc. and control overall operation while the GPU 250 renders frames from data stored in the storage 280. The AP 270 may support the GPU 250 and the control circuitry. In an embodiment, the control circuitry 260 and the AP 270 may be integrated as one component. The AP 270 may include instructions that when executed, cause the AP 270 to perform certain actions. The storage 280 is configured to store data such as image source, data collected by the sensors 230, instructions and other information usable by the GPU 250, the control circuitry 260 and the AP 270.

Figure 3:
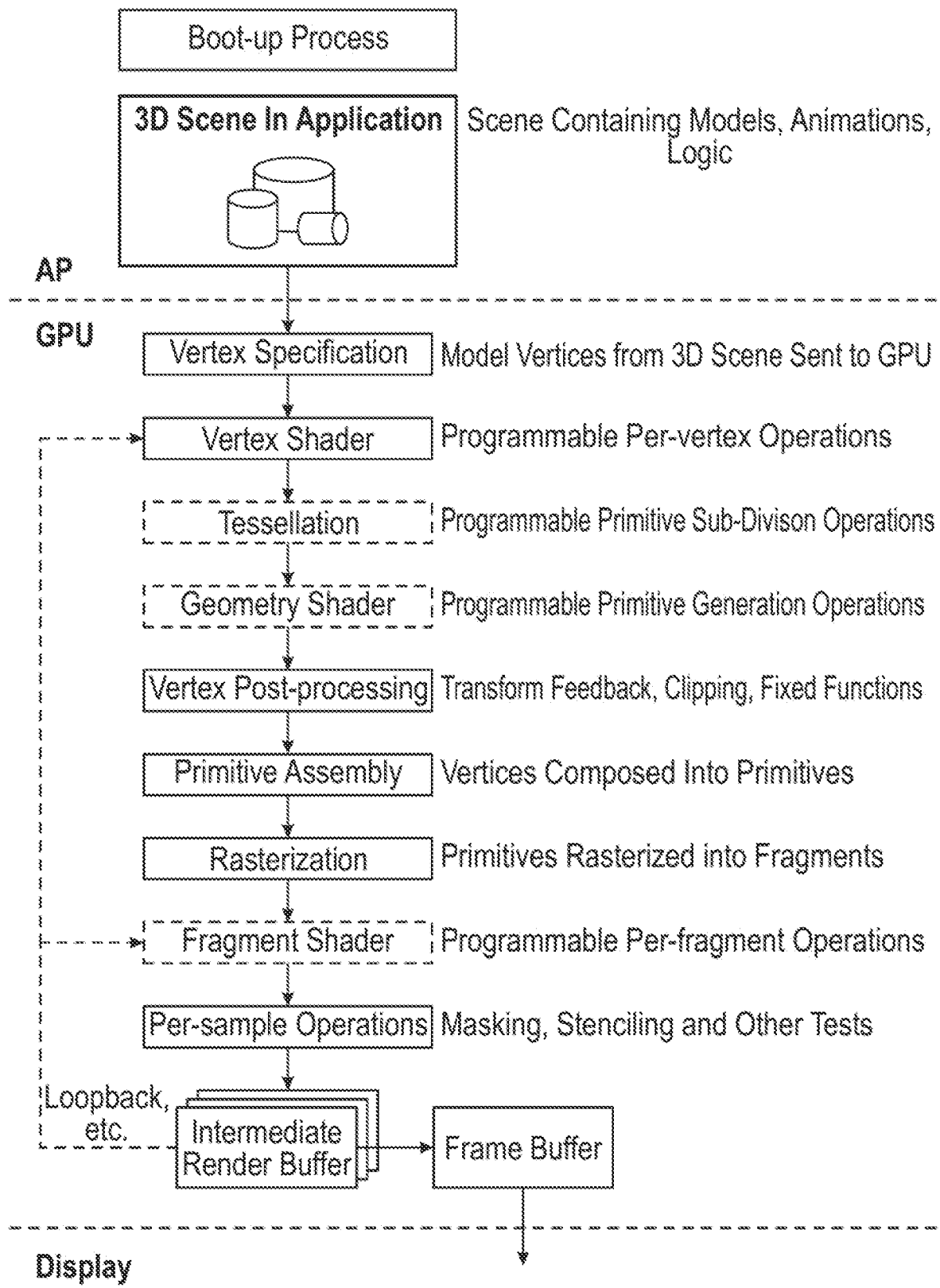
FIG. 3 illustrates an example of presenting image onto a display with a wearable system.

FIG. 3 is a flowchart illustrating an example method of rendering images onto a display with a wearable system, such as may be performed by an AP (which may be considered a CPU of the wearable system in some implementations) and a GPU. When a user turns on the wearable system in order to execute an application for image display, the AP looks up start-up instructions stored in storage and executes them before executing the application (e.g., an operating system and/or applications that execute on the operating system). In some embodiments, the AP initiates operations to check components of the wearable system for proper functioning and loads an operating system, which is generally referred to as a boot process. A boot process takes some time to complete (e.g., from 20-90 seconds) during which time functionality of the wearable system is limited. After the wearable system boots up completely, the GPU is able to render 3D images as adjusted 2D images that are projected onto the left-eye and right-eye display panels. However, in some implementations the GPU is not available during the boot up process, and thus, the dynamic generation of geometrically transformed images using the graphics pipeline is not possible until the boot process completed.

In the example of FIG. 3, the graphics pipeline is implemented as dedicated hardware, for example, as part of the GPU. In the context of the wearable headset, the graphics pipeline is configured to turn 3D scenes in applications into video or image files that are displayed on the display of the wearable headset. As illustrated in FIG. 3, the graphics pipeline may comprise vertex shader, tessellation, geometry shader, vertex post-processing, primitive assembly, rasterization, fragment shader and per-sample operation. In some embodiments, a graphics pipeline may include fewer or additional blocks and/or the blocks may be performed in an order different than illustrated in FIG. 3.

In some embodiments, a 3D scene is formed of 3D coordinates which may form multiple 3D vertices. The vertex shader may transform each vertex's 3D position in virtual space to 2D coordinates at which it appears on the screen. The vertex shader can manipulate properties such as position, color, and texture coordinates. In this example, the output of the vertex shader goes to the optional tessellation stage, which manages datasets of 2D coordinates presenting objects in a scene and divides 2D coordinates into suitable structures for easy rendering. The optional geometry shader then generates graphics primitives, such as points, lines, and triangles based on the results of the vertex shader. The vertex post-processing includes fixed functions such as transforming feedback and clipping. The transforming feedback is a way of recording outputs from the vertex shader into a buffer. The clipping clips the primitives to a portion which will be processed. The primitive assembly converts the divided vertex into a sequence of base primitives by providing the order to the base primitives. The rasterization converts a vector image into a raster image such as pixels, dots, lines, that when displayed together, can create an image. The fragment shader processes a fragment generated by the rasterization into a set of color and a single depth value. The fragment is a data necessary to generate a single pixel. The per-sample operation tests the fragment by depth test, stencil test, etc., and writes the results in various buffers. The 2D image may be stored in a frame buffer as a format of an image.

In some implementations, to keep the graphics pipeline secure, the graphics pipeline is separated from the AP during the boot-up process so that a user or external process cannot access the GPU. More details regarding the separation of the graphics pipeline and the AP will be discussed below.

Figure 4:
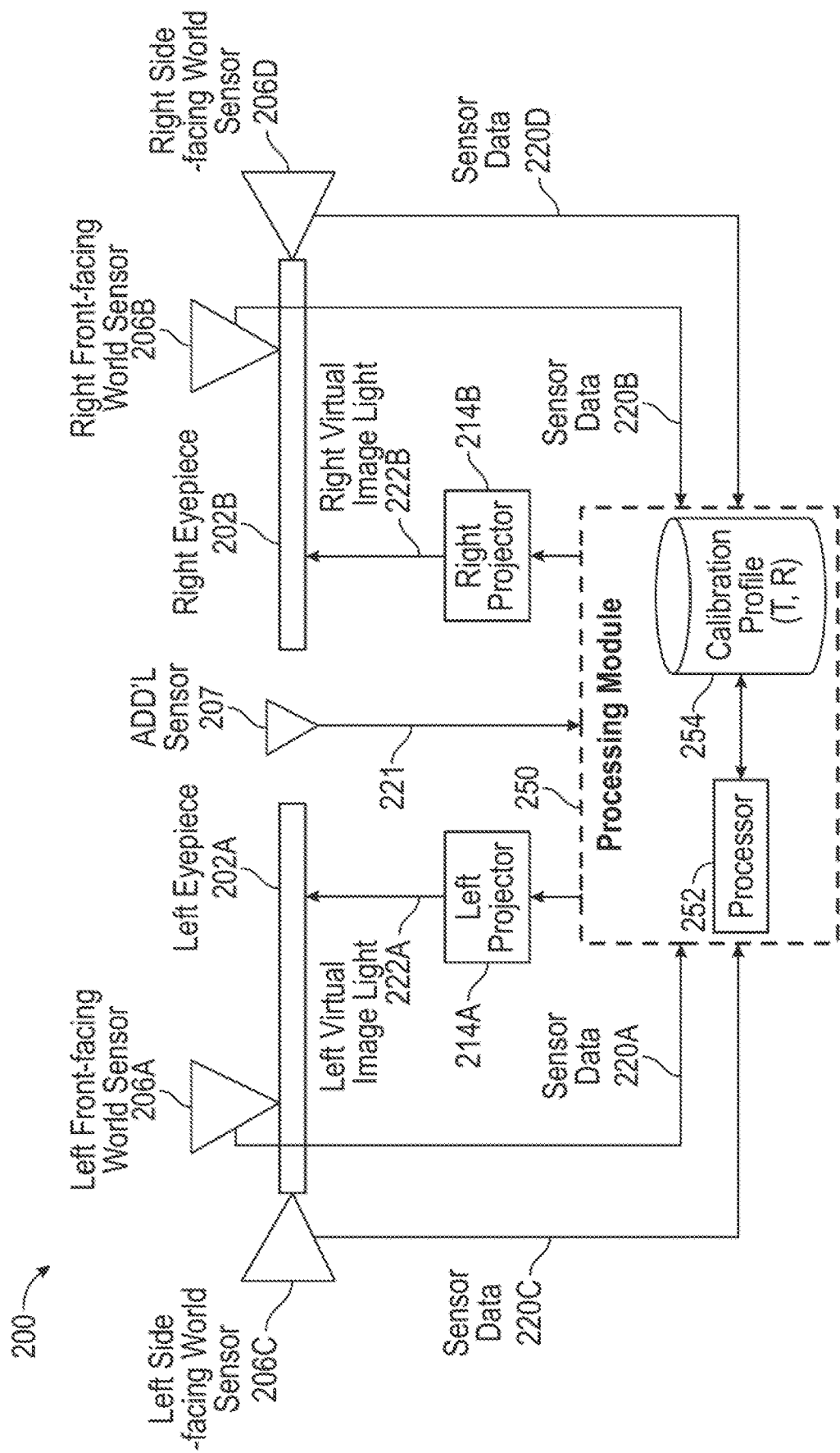
FIG. 4 illustrate a block diagram of a wearable device using calibration to prevent geometry distortion.

FIG. 4 illustrates a block diagram of a wearable device 200 using calibration to prevent distortion of display images. The wearable device 200 may include a left eyepiece (left-eye display panel) 202A as part of a left optical stack and a right eyepiece (right-eye display panel) 202B as part of a right optical stack. Sensors 206A, 206B, 206C, 206D may be configured to generate, detect, and/or capture sensor data 220A, 220B, 220C, 220D, respectively, which may be electronic data corresponding to a physical property of the environment surrounding wearable device 200, such as motion, light, temperature, sound, humidity, vibration, pressure, and the like or intrinsic or extrinsic characteristics of the wearable device such as distance between the left-eye display 202A and right-eye display 202B, distortion angle of the wearable device 200. The sensor data 220A, 220B, 220C, 220D is used for the calibration profile 254. The position of displayed images may be determined using the calibration profiles. More details for the geometry correction can be explained with the references. For example, U.S. patent application Ser. No. 16/230,169 titled "Method for calibrating an augmented reality device" filed on Dec. 21, 2018, the entire disclosure of which is hereby incorporated by reference, for all purposes, as if fully set forth herein. Further, U.S. patent application Ser. No. 16/355,611 titled "Image correction due to deformation of components of a viewing device" filed on Mar. 15, 2019, the entire disclosure of which is hereby incorporated by reference, for all purposes, as if fully set forth herein.

Example of Displaying Logo Image

Figure 5:
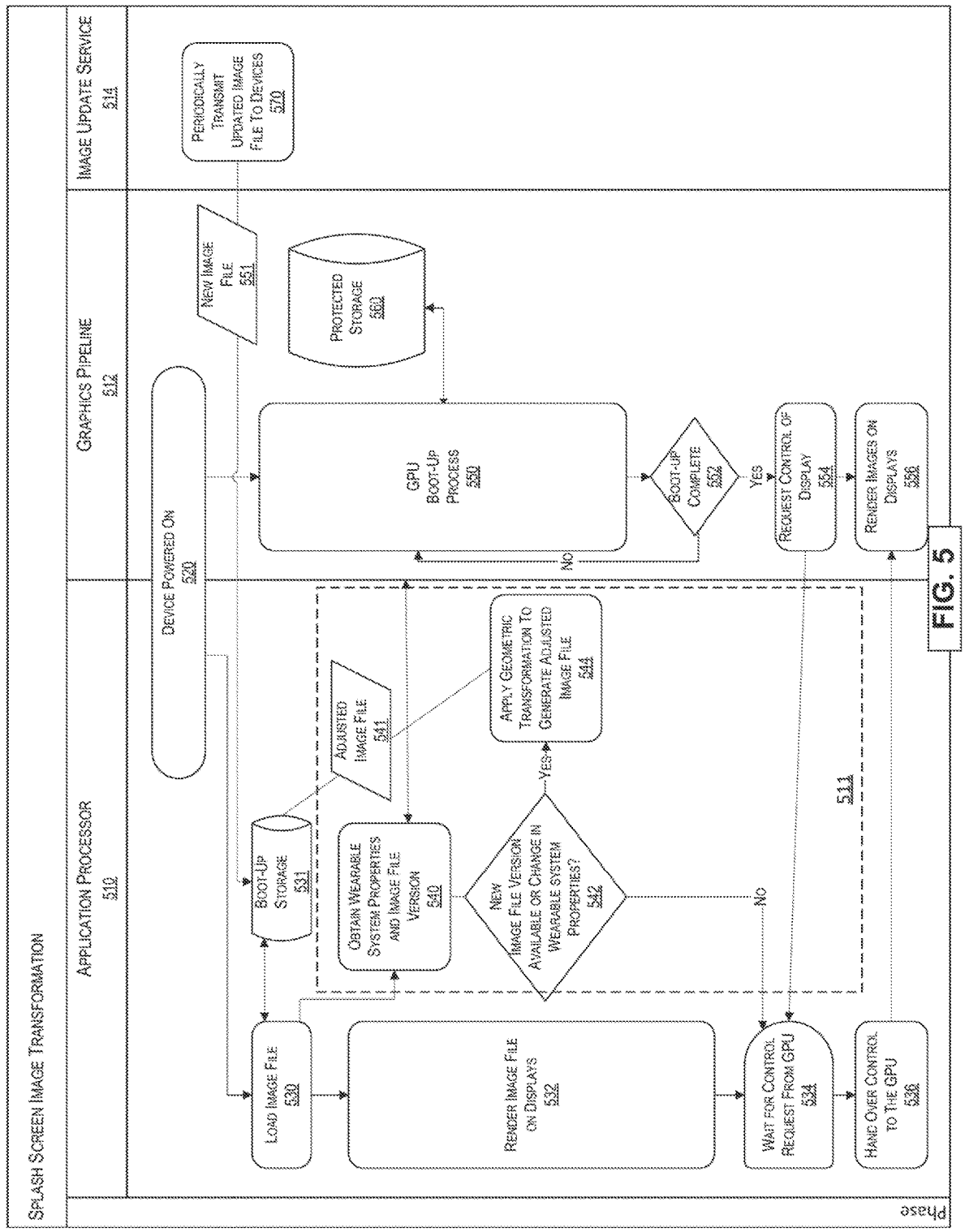
FIG. 5 is a flowchart illustrating an example boot-up process.

FIG. 5 is a block diagram illustrating an example data flow of a boot-up process for a wearable device. In this example, operations that are performed by an application processor 510, a graphics pipeline 512, and an image update service 514 are illustrated in separate portions of the diagram. In other embodiments, the operations may be performed by different, fewer, or additional components. Additionally, depending on the embodiment, the method of FIG. 5 may include fewer or additional blocks and the blocks may be performed in an order that is different than illustrated. Advantageously, the application processor 510 includes logic that generates geometric transformations of image files so that they are properly displayed on wearable headset, including a protected storage 560.

Beginning at block 520, the wearable device is turned on, such as by the user pressing a power button on the wearable headset. Responsive to the device being powered on, a boot-up process is initiated at both the application processor 510 and the graphics pipeline 512. The graphics pipeline 512 performs a boot-up process 550, such as loading device drivers, operating system software, application software, testing hardware component functionality, etc. Depending on the embodiment, the boot-up process may take 30-120 seconds or more, during which time the graphics pipeline 512 is not available to render geometrically transformed images on the display. The graphics pipeline 512, including the boot-up process 550, has access to protected storage 560, which is advantageously not accessible to the application processor 510. Thus, an application provider, such as a developer that creates a virtual worlds software application for the wearable device, cannot gain access to the sensitive information in the protected storage 560.

At block 552, the graphics pipeline continues the boot-up process until it is complete, and at that point the method continues to block 554 where control of the display is requested from the application processor 510. At block 556, the graphics pipeline 512 is fully booted up and has access to the display hardware, such as display buffers, to render graphic images on the display of the wearable system.

In the example of FIG. 5, an external server 514, such as may be operated by a provider of the wearable system and/or an operating system executing on the wearable system, may provide an updated splash screen logo (e.g., an image file 551) periodically to the wearable device. The updated version of the logo image is stored in boot-up storage 531 and may be accessed during a next boot-up cycle by the application processor 510. Depending on the embodiment, the image file 551 may be stored in various formats, such as standard bitmap (BMP) format or any other graphic format. The standard bitmap format is a raster graphics image file format, or a dot matrix data structure. In a bitmap file, each pixel is specified by a number of bits.

Now turning to the process performed by the application processor 510, beginning at block 530, which occurs shortly after the device is powered on at block 520, the application processor 510 loads the image file from the boot-up storage 531. The image file is then rendered on the display of the wearable device at block 532. At block 534, the application processor 510 receives a request from the graphics pipeline 512 (block 554) indicating that the GPU boot-up process is complete. Subsequently, the application processor 510 hands over control of the display to the GPU at block 536.

In some embodiments, if there is no image file stored in the boot-up storage 531, a splash screen image may not be displayed during that boot-up process. For example, when the wearable device is turned on after manufacturing for the first time, the logo image may not be stored in the bootup storage 531, and may be requested from the image update service 514 at that time. In some embodiments, during manufacturing of the wearable device, the logo image may be stored in the boot-up storage 531 so it is accessible during the initial boot-up process by the end user.

As shown in FIG. 5, concurrent to loading and display of the image file by the application processor in blocks 530 and 532, a process 511 determines whether a geometric transformation of an image file should be performed for use in a subsequent boot-up process. In this example, two conditions (discussed separately below) are indicated as initiating processing of an image file for display on the wearable system.

At block 540, the application processor 510 obtains properties of the wearable system that may impact how a user views images rendered on the display. For example, these properties may include intrinsic and/or extrinsic properties of the wearable headset, such as factory calibration data, mechanical deformation data (e.g., distance between the left-eye display and right-eye display and distortion angle of the wearable device), and the like. Then, at block 542, if the wearable system properties have changed since the wearable system was last shut down, the method continues to block 544 where geometric transformations are applied to the image file to generate an adjusted image file 541 that is stored in the boot-up storage 531 where it will be accessed in a next boot-up process at block 530. In some embodiments, the intrinsic/extrinsic properties of the wearable device may be determined and/or obtained before the application processor 510 loads the logo image or anytime during the boot-up process. The intrinsic/extrinsic properties of the wearable device may be stored in storage (not illustrated) to which both the application processor 510 and the graphics pipeline 512 have access so that both processors may make use of the intrinsic/extrinsic properties.

Returning to block 540, the application processor 510 further determines a version of the image file currently rendered (block 532). If, at block 542, the application processor 510 determines that the current version rendered is different than the latest version of the image file, the latest version of the image file is accessed, such as by requesting from the image update service 514 or identifying the new image file 551 already accessible on the boot-up storage 531. The new image file 551 is then processed by the geometric transformations block 544 for proper display on the wearable device. Thus, at block 542, the method continues to a geometric transformation block 544 if either of the conditions (e.g. a new image file version is available or a change in the wearable system properties) is detected. When the device is next powered on at block 520, the adjusted image file 541 that is stored in boot-up storage 531 is accessed at block 530 and displayed during the boot-up process. In some embodiments, other conditions may trigger execution of block 544 to apply geometric transformations to generate an adjusted image file.

Example Animation Effects

Figure 6A:
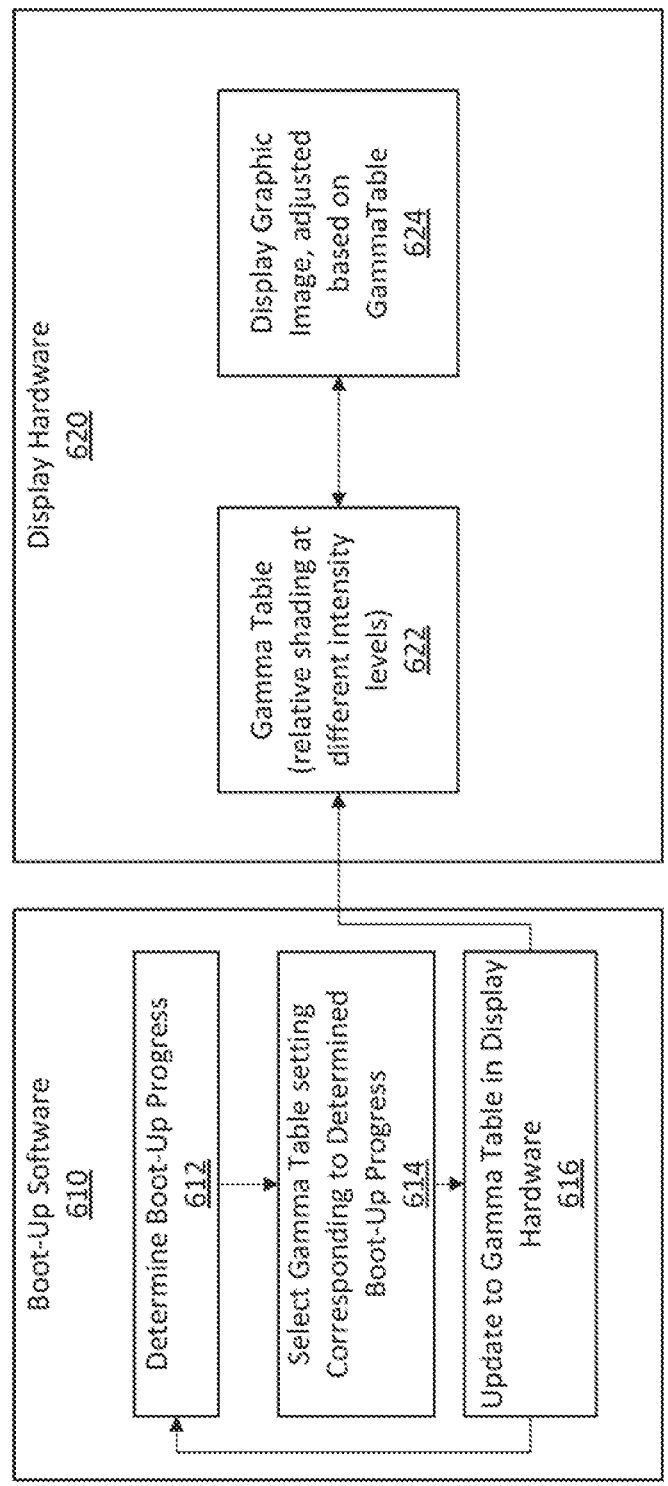
FIG. 6A is a flowchart illustrating an example process of updating a gamma table in a display hardware to create an animation effect.

FIG. 6A is a flowchart illustrating one example of a process that may be performed to provide an animation effect during a boot-up process. Progress of a boot-up process may be shown, for example, with an animation such as a progress circle rotating clockwise or counter-clockwise or a progress bar moving forward and/or backward. An animation effect may be achieved by a rapid succession of sequential images that minimally differ from each other and a human visual system perceives the sequential images as the animation. However, rendering sequential images is computationally difficult for the application processor, and the graphics pipeline is not available until the boot-up process is complete. Thus, the method described herein provides an efficient way of providing an animation effect without relying on processing by the graphics pipeline.

In the example of FIG. 6A, boot-up software 610 is executed by the application processor to periodically select and update a gamma table 622 of the display hardware 620, so that an animation effect is visualized by the user viewing the display by virtue of values in the gamma table being adjusted. In some implementations, the display hardware of the wearable system accesses a gamma table in conjunction with rendering image data on the display. For example, the gamma table may be accessed multiple times per second, such as 60 times per second for a 60 Hz refresh rate, and used to apply gamma corrections to the underlying image data. In this embodiment, the application processor does not change the static image itself, but instead rendering of the static image may be modified based on changes to the gamma table, such as changes that are made by the application processor, that cause adjustments in pixel values of the static image. Thus, if the gamma table is changed sequentially, e.g., by updating the gamma table sixty times per second, and changes in the updated gamma table are applied to the image data, an animation effect can be applied to the static image.

Beginning at block 612, the boot-up software 610 determines progress of the boot-up process. For example, the progress may be 0% when the device is initially powered on, and may move progressively towards 100% over the 30-120 second boot-up process. For example, the boot-up process may include multiple software processes that are executed, and which are associated with respective stages of the boot-up process. A progress monitor may track which of the software processes have been executed, which have not yet been executed, an expected total boot-up time, an elapsed boot-up time, and/or which are currently being executed, to determine the bootup progress. Any other method of determining progress of the bootup process may also be used.

Next, an updated gamma table (or updates to a current gamma table 622 in the display hardware 620) is selected based on the determined boot-up progress. For example, a first gamma table may be associated with progress of 0%-5%, a second gamma table may be associated with progress of 5%-10%, a third gamma table may be associated with progress of 10%-15%, and so on. In some embodiments, a series of gamma tables that are selected in a round robin manner may be used during different portions of the boot-up process. For example, during the 0%-5% progress level, a series of ten gamma tables may be cycled multiple times to provide a desired animation effect associated with the 0%-5% progress.

Next, at block 616 the selected gamma table is stored in the hardware gamma table 622, which is then accessed periodically at block 624 as graphics are displayed on the display of the wearable system. Thus, in an example implementation with a 60 Hz refresh rate for a display, the gamma table 622 may be accessed 60 times per second for relative shading information associated with pixel intensity levels. The process then repeats blocks 612-616 so that as the progress level changes, corresponding changes are made to the gamma table, which causes changes in the animation effect associated with the static image.

Figure 6B:
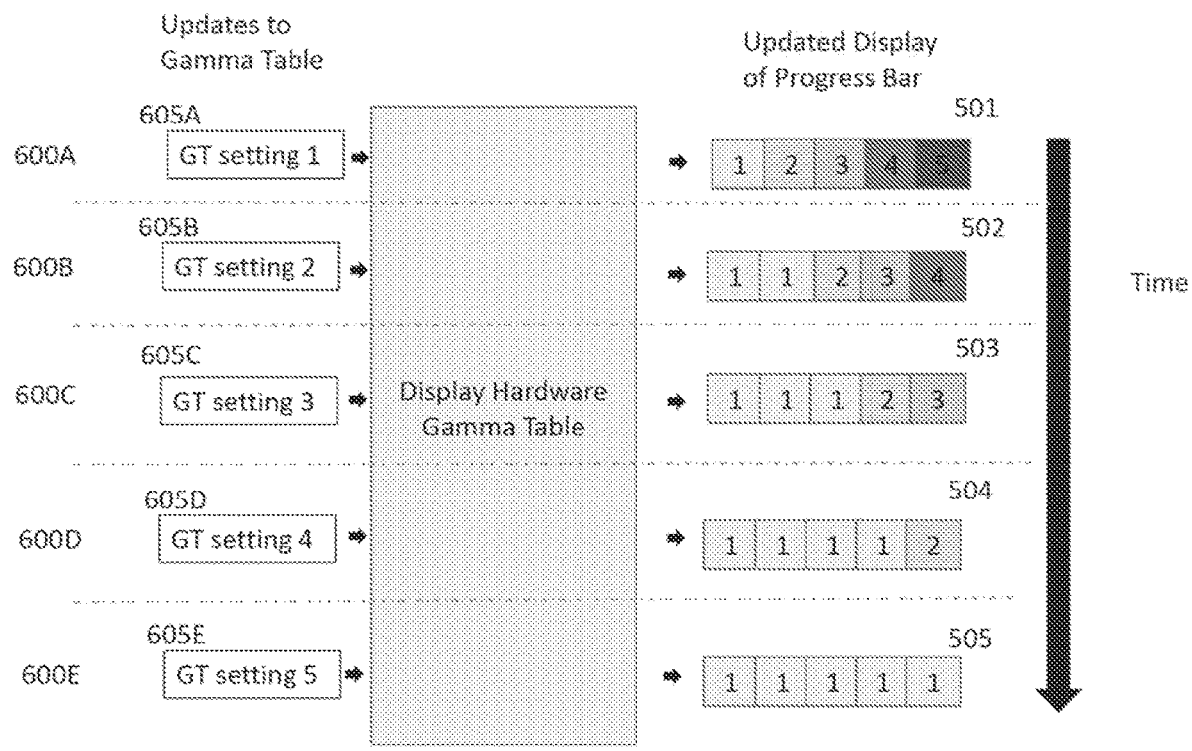
FIG. 6B illustrates an example of an animation effect on an image.

FIG. 6B illustrates an example of stages of an animation effect that may be applied to a static image using gamma table scrolling. In this example, an example status bar is illustrated at five stages of animation, represented as stages 501-505. In this example, the progress bar includes five sections, which may each represent a single pixel or a set of pixels, such as multiple pixels that form a rectangular, circular, or other area. In this example, the number inside each of the five portions of the status bar can represent (but is not limited to) a pixel value, such as a grayscale value or color index. When a human views the progress bar at stages 501-505 separately and sequentially, the human brain perceives that the pixel value 1 is spreading from the leftmost portion to the right until it covers all 5 portions.

Each of the frames 600A-600E may be a single frame or may be associated with multiple frames (e.g., 20 frames of a 60 Hz display rate, such that each frame is displayed for ⅓ of a second). As discussed with reference to FIG. 6A, during the boot-up process the wearable system may determine boot-up progress, select a gamma table setting 605A-605E corresponding to the determined boot-up progress, update the display hardware gamma table with the selected gamma table setting 605A-605E, and repeat these steps throughout the boot-up process.

The display hardware gamma table may be accessed to determine adjustments to pixel values, such as to particular areas of pixels of the progress bar. Thus, when the gamma table is updated by the gamma table settings received from the boot-up software in each of the frames, the pixel value of the progress bar is changed as illustrated in FIG. 6B.

Figure 7A:
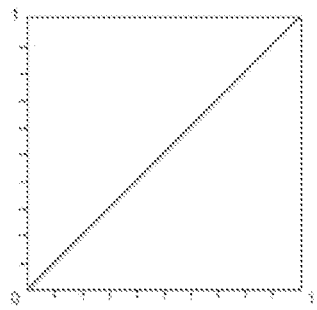
FIGS. 7A-7C show examples of different gamma tables.
Figure 7B:
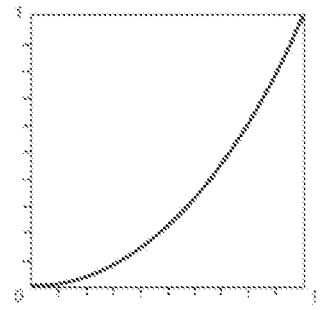
Figure 7C:
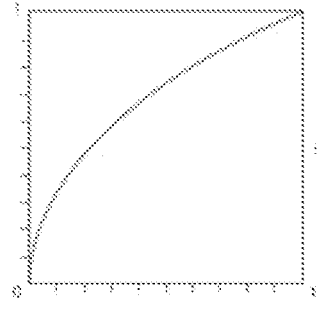

FIGS. 7A-7C show examples of different gamma tables. Typically, gamma is a nonlinear operation used to encode and decode pixel values such as luminance or tristimulus values, in image systems. Generally, gamma is defined by the following power-law expression:

$$V_{out} = AV_{in}^{\gamma}$$

where the non-negative real input value $V_{in}$ is raised to the power $\gamma$ and multiplied by the constant A, to get the output value $V_{out}$. In the common case of A=1, inputs and outputs are typically in the range 0-1. In another embodiment, the inputs (x axis) and the outputs (y axis) can represent pixel values, for example, 0-255. An image can be transformed by remapping or replacing a pixel value with a different value using a gamma table as illustrated in FIGS. 7A-7C. Referring to FIG. 7A, gamma equals one which means input is the same as output. Thus, when the gamma table of FIG. 7A is stored in the display hardware, the input image is the same as the output image. Referring to FIG. 7B, gamma equals two, so the gamma-adjusted output image becomes darker than the input image. Referring to FIGS. 7C, gamma equals 0.5, so the gamma-adjusted output image becomes lighter than the input. The gamma curves illustrated in FIGS. 7A-7C are examples showing that the output image can be changed by applying a gamma correction to images. Gamma levels and corrections are not limited to those illustrated in FIGS. 7A-7C.

Example Encoding of Static and Animated Graphics in Splash Screen Image

FIGS. 8-11 illustrates an example representation of a static image (e.g., a logo and/or other splash screen graphics) and a progress bar being encoded into a composite encoded image that is used to render both the static image and an animated progress bar during a bootup process. Advantageously, the encoding makes use of the display hardware's ability to apply gamma transformations to display data as changes to the gamma table are made. In the example of FIGS. 8-11, an 8-bit gamma table is used, and pixel values for the static image are encoded in pixel values 0-63 of the gamma table, while pixel values for a progress bar are encoded in pixel values 64-255 of the gamma table. In other embodiments, other sizes of gamma table may be used and/or different ranges of pixel values may be used for the image and/or progress bar. As discussed further below, this configuration of encoding pixel values within a dynamic gamma table (e.g., that changes values) allows both the static image and an animated progress bar to be rendered, based on a composite encoded image (e.g., a bitmap file) and periodic updates to the gamma table.

FIG. 8A illustrates an example of pixel data associated with a static image that may be displayed during a bootup process. For example, the static image may include a logo. In the example of FIG. 8A, a square logo that lightens in color towards the center of the square is illustrated. In this example, the pixel values range from 0-255, which may represent grayscale values for the static image (e.g., 0=black and 255=white). In some embodiments, multiple sets of pixel values may be associated with each pixel, such as a red, green, and blue pixel value, which each may range from 0-255. In some embodiments, the range of pixel values and/or the number of pixel values for each pixel may vary, such as depending on the bit depth of the color hardware and/or software of the wearable system. The image data of FIG. 8A may be stored in an existing file format, such as BMP, PNG, JPG, etc., or another existing or proprietary format.

In the example of FIG. 8B, the pixel values of the image in FIG. 8A have been interpolated from the range 0-255 to a range set aside for storing encoded image data, e.g., 0-63. Thus, pixel values of 255 (FIG. 8A) are interpolated to encoded values of 63 (FIG. 8B), pixel values of 55 are interpolated to encoded values of 14 (FIG. 8B), and so on. The encoded pixel values of FIG. 8B will later be overlaid with encoded pixel values associated with the progress bar (see FIG. 10).

Figure 9A:
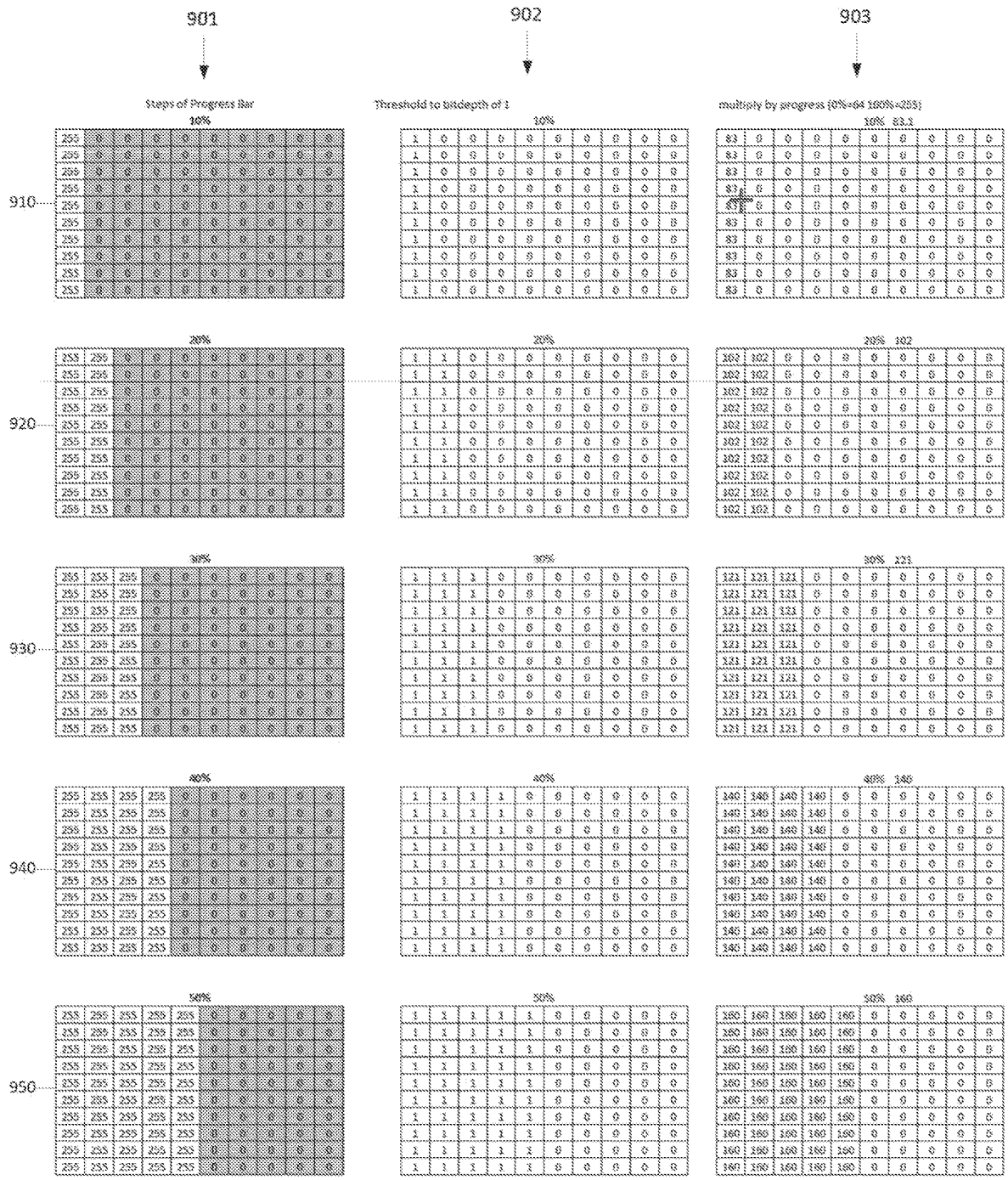
Figure 9B:
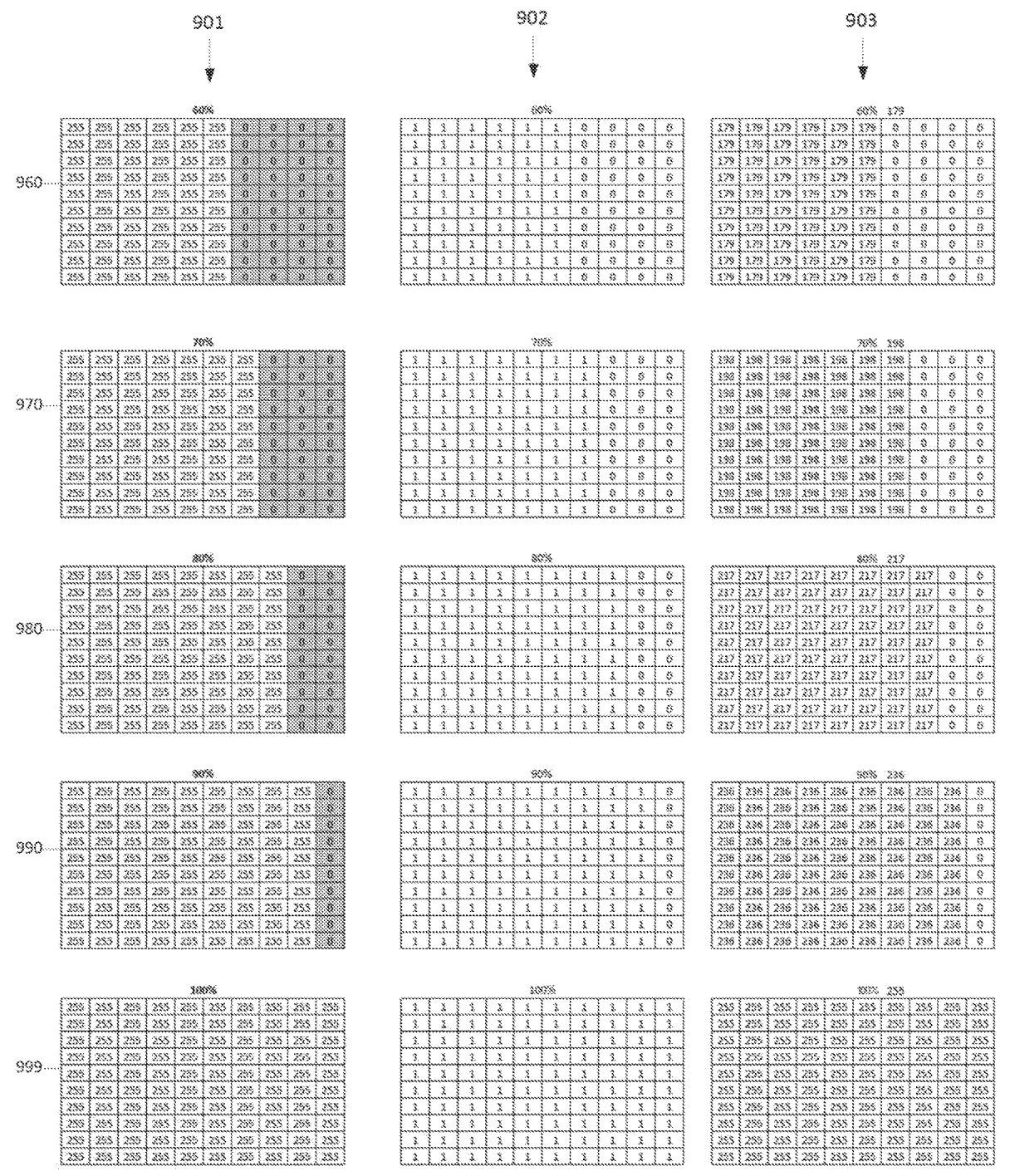

FIGS. 9A and 9B illustrate pixel values transformations applied to various stages of a progress bar as part of an encoding process. In this example, a progress bar includes 10 stages (or steps) each associated with image data at one of 10 levels of progress, which may be associated with progress of a bootup process. In particular, image data 910 corresponds with 10% progress, image data 920 corresponds with 20% progress, image data 930 corresponds with 30% progress, and so on. Thus, to indicate progress of the boot-up process, for example, the images 910-999 could be cycled sequentially to create an animation affect. However, in a system where a splash screen is limited to a single image, animation by sequencing through multiple images is not possible. As noted elsewhere herein, though, the systems and methods disclosed herein advantageously encode these various stages of the progress bar into a single encoded image that, in conjunction with logic that programmatically updates a gamma table, creates a similar progress bar animation affect.

In the particular example of FIGS. 9A and 9B, the original progress bar pixel values are indicated in column 901, at each of the progress stages. In column 902, each of the progress bar image values in column 901 has been thresholded to a bit depth of one. For example, for pixel values ranging from 0-255, this thresholding may set pixel values in the range of 0-127 to 0, and pixel values in the range of 128-255 to 1.

Next, in column 903 the threshold values in column 902 are multiplied by an encoded multiplier that corresponds with the progress level, and that is within the gamma table bit range reserved for the progress bar (e.g., 64-255 in this example). In this example, each 10% increment of progress (e.g., of the boot-up process) correlates with an increase in encoded multiplier of about 19.1. Thus, at 0% progress, the encoded multiplier is 64 (e.g., the lowest value of the reserved progress bar value range in the gamma table), at 10% progress the encoded multiplier is 83, at 20% progress the encoded multiplier is 102, at 30% progress the encoded multiplier is 121, and so on as indicated in column 903, until at 100% progress the encoded multiplier is 255 (the highest value of the reserved progress bar value range in the gamma table). These encoded multipliers are applied to the thresholded values in column 902 to produce the encoded values for each of the progress stages, as shown in column 903.

FIG. 9C illustrates an example of encoded pixel values from each of the progress stages of FIGS. 9A-9B overlaid into a single set of encoded pixel values. In this example, the encoded pixel values in column 903 are overlaid upon one another, starting with the 100% encoded pixel values down to the 10% encoded pixel values, to obtain the encoded pixel values 904. In some implementations, encoded pixel values lower than 64 (or other minimum value of a reserved progress bar value range in the gamma table) are set to 64 (or other minimum value).

FIG. 10 illustrates an example of image data that includes encoded pixel values 820 of the static image (e.g., the square logo) in a lower portion of the image file and the encoded pixel values 904 of the progress bar in an upper portion of the image file. This composite image data 1000 may be stored as a bitmap image file, or other image file. Advantageously, the encoded pixel values allow the static image to be displayed properly, as well as the progress bar to be animated according to progress of the bootup process, as gamma table values are updated.

Figure 11:
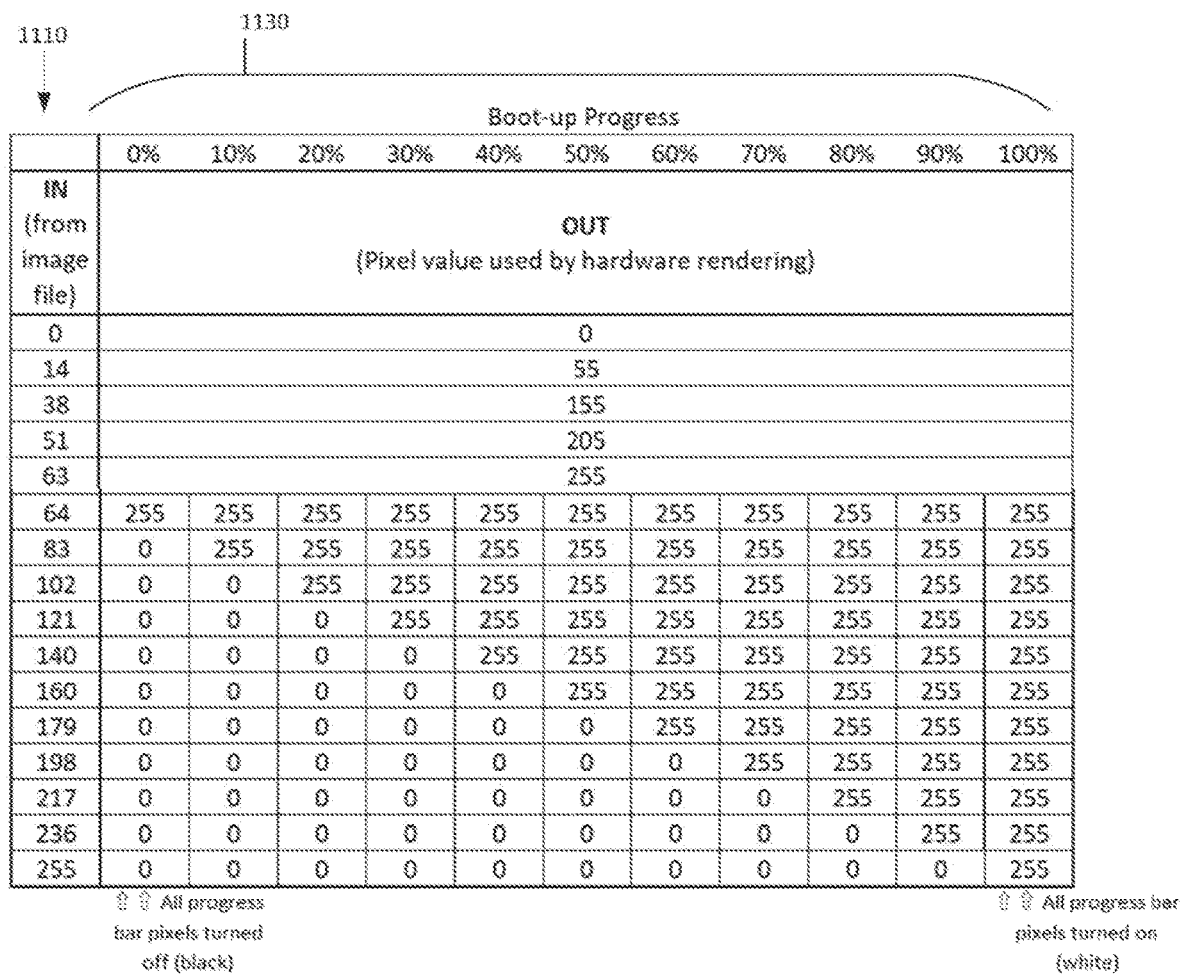
FIG. 11 illustrates an example of gamma table values associated with certain pixel values of image data.

FIG. 11 illustrates an example of gamma table values associated with certain pixel values of image data. For example, column 1110 represents possible pixel values (or encoded pixel values) of an image, and columns 1130 represent actual pixel values that are rendered at the corresponding bootup progress stage. Thus, FIG. 11 illustrates eleven sets of values possible for a gamma table so that multiple progress stages may be rendered in an animated progress bar. In this example, for the sake of brevity, the pixel values in column 1110 include only those particular values used in the example of FIGS. 8-10. However, for more complex shading, coloring, and/or animation, additional pixel values may be adjusted in the gamma table. For example, in an 8-bit pixel depth, up to all 256 pixel values may be associated with corresponding output values for a static image or a progress bar (or other animation).

In this example, the pixel values from 0-63 (in column 1110) are associated with output values that are consistent throughout the bootup process. Thus, pixels having values of 0-63 maintain a consistent rendering throughout the boot up process. As discussed above, in this example the static image, such as a logo, may be encoded with these pixel values.

With reference to pixel values 64-255, the output pixel values that are rendered are adjusted based on stage of the boot up process. For example, when bootup progress reaches 10%, the gamma table is updated so that for input pixel values of 64 and 83, the output pixel value that is rendered is 255. Thus, using the 10% gamma table values of FIG. 11, a first column of pixels of the encoded pixel values 904 (with values of 83) is turned on, while the remaining columns of pixels remain turned off. As a bootup progress monitor determines that updates to the progress bar are needed, such as at each increment of 10% in the example of FIGS. 8-11, gamma table values may be updated with the corresponding values shown in FIG. 11 to create an animation effect of the progress bar increasing in size from left to right. In some embodiments, only those gamma table values that have changed from gamma table values of a previous boot-up stage are written to the gamma table, while in other embodiments all gamma table values (e.g., 256 values in the embodiment of FIG. 11) are written to the gamma table upon each boot-up stage change.

In some embodiments, additional adjustments to pixel values and/or encoded pixel values may be made. For example, prior to thresholding the pixel values (e.g., row 902) or interpolation (e.g., FIG. 8B), image corrections may be applied to the pixel values, such as to correct for intrinsic and/or extrinsic properties of the wearable system, such as deformation of the headset since the startup image file was last rendered. Thus, the pixel values may be selectively shifted, rotated, amplified, reduced, etc., to compensate for such intrinsic and/or extrinsic properties.

In some embodiments, the pixel values of the static image and/or progress bar are rendered into a left and right projection, such as may be displayed to the left and right eye of a wearer of the wearable system. For example, prior to thresholding or interpolation (e.g., FIG. 8B), the pixel values may be rendered to multiple projections, such as to implement a 3D effect of the images when the multiple projections are viewed. In some implementations, rendering of multiple projections may be performed in conjunction with modifying the pixel values to compensate for intrinsic and/or extrinsic properties. In embodiments where multiple projections are rendered (e.g., a left eye image and a right eye image), an encoding process may be performed separately for each image. For example, the static image and progress bar encoding processes of FIGS. 8-11 may be performed once on a left eye image and again on a right eye image. These encoding processes may be performed sequentially or in parallel.

In some embodiments, the composite encoded image, e.g., the single bitmap image, may include pixel values for multiple projections of the image. For example, a composite encoded image may include a left projection in a left half of the pixel space and the right projection in a right half of the pixel space, so that both the left and right projections may be rendered on the wearable system during the boot-up process.

Figure 12:
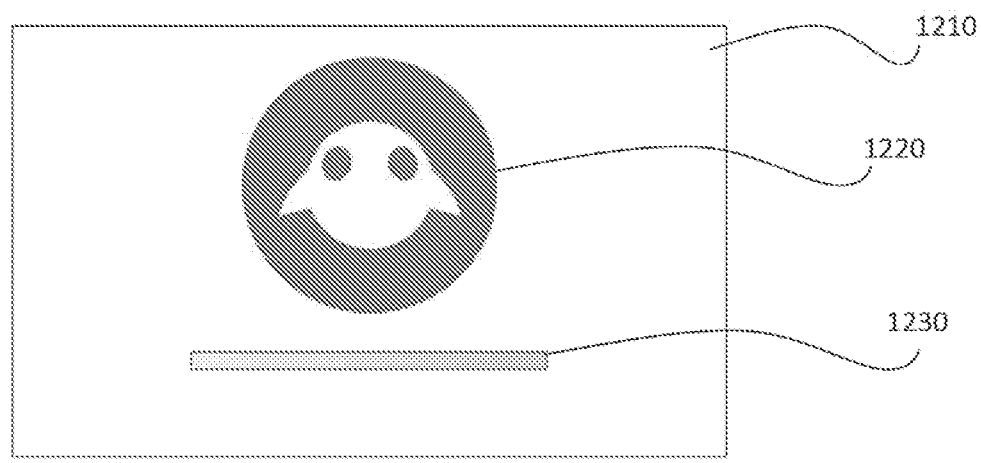
FIG. 12 illustrates an example splash screen image that includes a static image and an animated progress bar, which may be implemented using the systems and methods discussed herein.

FIG. 12 illustrates an example splash screen image 1210 that includes a static image 1220 and an animated progress bar 1230, which may be implemented using the systems and methods discussed herein. For example, the static image 1220 and progress bar 1230 may be encoded in a single image file, such as a bitmap image, and displayed in conjunction with updates to a hardware gamma table at various stages of bootup progress to create the effect of an animated progress bar. In other embodiments, other shapes, sizes, colors, etc. of progress bars may be used, and animation effects may be varied by adjustments to gamma table settings. For example, a circular progress bar may be implemented in a similar manner as discussed herein.

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example methods. Corresponding devices, systems, and/or other hardware that performs some or all of the methods described in any particular example are also contemplated. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example 1: A computerized method, performed by a wearable system having one or more hardware computer processors and one or more non-transitory computer readable storage device storing software instructions executable by the wearable system to perform the computerized method comprising: loading an image file into a display buffer; determining a boot-up stage of the wearable system; selecting one of a plurality of sets of gamma table values associated with the determined boot-up stage; and writing the selected set of gamma table values to gamma table storage associated with the display buffer, wherein the wearable system is configured to render the image file as adjusted by the gamma table values in the gamma table storage on the display.

Example 2: The method of example 1, wherein the plurality of sets of gamma table values includes at least 10 sets of gamma table values associated with a corresponding at least 10 boot-up stages.

Example 3: The method of any of examples 1-2, wherein the image file includes a first set of pixels associated with a static image, each of the first set of pixels having pixel values in a first range, and a second set of pixels associated with a progress bar, each of the second set of pixels having pixel values in a second range that does not overlap with the first range.

Example 4: The method of any of examples 1-3, wherein the first range is 0-63 and the second range is 64-255.

Example 5: The method of any of examples 1-3, wherein the gamma table values associated with the first range of pixel values are the same for each boot-up stage, and the gamma table values associated with at least some pixel values of the second range of pixel values change for corresponding boot-up stages.

Example 6: A computerized method, performed by a wearable system having one or more hardware computer processors and one or more non-transitory computer readable storage device storing software instructions executable by the wearable system to perform the computerized method comprising: for each pixel value of a static image, interpolating the pixel value to a first range of values; for each of a plurality of stages of a boot-up process: determining pixel values corresponding to an image depicting the stage of the boot-up process; for each of the determined pixel values, thresholding the pixel value to one bit; selecting an encoded multiplier of a plurality of encoded multipliers that is associated with the stage of the boot-up process, wherein each of the plurality of encoded multipliers is within a second range of values that is non-overlapping with the first range of values; calculating encoded pixel values for the determined stage of the boot-up process by multiplying each of the thresholded pixel values by the selected encoded multiplier; generating composite encoded pixel values by sequentially overlaying the encoded pixel values for the plurality of stages of the boot-up process; and generating an image file including the interpolated pixel values associated with the static image and the composite encoded pixel values associated with stages of the boot-up process.

Example 7: The method of example 6, further comprising: for each pixel value of a second static image, generating second interpolated pixel values by interpolating the pixel value to the first range of values; for each of a plurality of stages of the boot-up process: determining pixel values corresponding to a second image of a plurality depicting the stage of the boot-up process; for each of the determined pixel values, thresholding the pixel value to one bit; selecting an encoded multiplier of the plurality of encoded multipliers that is associated with the stage of the boot-up process, wherein each of the plurality of encoded multipliers is within the second range of values that is non-overlapping with the first range of values; calculating second encoded pixel values for the determined stage of the boot-up process by multiplying each of the thresholded pixel values by the selected encoded multiplier; generating second composite encoded pixel values by sequentially overlaying the second encoded pixel values for the plurality of stages of the boot-up process, wherein the image file further includes the second interpolated pixel values associated with the second static image and the second composite encoded pixel values associated with stages of the boot-up process.

Example 8: The method of any of examples 6-7, wherein the interpolated pixel values and the composite encoded pixel values are configured for rendering on a left portion of a display and the second interpolated pixel values and the second composite encoded pixel values are configured for rendering on a right portion of the display.

Example 9: The method of any of examples 6-8, wherein the thresholded pixel values are each either zero or one.

Example 10: The method of any of examples 6-9, further comprising: for each of the stages of the boot-up process, generate one or more gamma table values associated with a corresponding one or more encoded pixel values for that stage of the boot-up process.

Example 11: The method of any of examples 6-10, further comprising: generating gamma table values associated with the interpolated pixel values, wherein the gamma table values are usable to determine pixel values of the static image prior to interpolating the pixel values.

Example 12: The method of any of examples 6-10, further comprising rendering a boot-up image by: loading the image file into a display buffer; periodically determining a current stage of a boot-up process; selecting gamma table values associated with the current stage; and storing the selected gamma table values to gamma table storage associated with a display, wherein the display is configured to render the image file as adjusted by the gamma table values.

Example 13: A computerized method, performed by a wearable system having one or more hardware computer processors and one or more non-transitory computer readable storage device storing software instructions executable by the wearable system to perform the computerized method comprising: loading an image file; rendering the image file on a display of the wearable system; while the image file is rendered on the display of the wearable system: obtaining wearable system properties; determining whether the wearable system properties have changed from a previous boot-up process; if the wearable system properties have changed, applying one or more geometric transformations to the image file to generate an adjusted image file, and storing the adjusted image file for use by a next boot-up process.

Example 14: The method of example 13, wherein the properties of the wearable system include one or more of extrinsic or intrinsic properties of the wearable system.

Example 15: A computerized method, performed by a wearable system having one or more hardware computer processors and one or more non-transitory computer readable storage device storing software instructions executable by the wearable system to perform the computerized method comprising: accessing memory configured to store a boot image file; in response to determining that the accessed memory does not include a current boot image file, generating the boot image file at least partially concurrent to execution of a boot-up process by a graphics pipeline.

Example 16: The method of example 15, wherein the accessed memory is determined to not include the current boot image file if the accessed memory does not include an image file.

Example 17: The method of any of examples 15-16, wherein the accessed memory is determined to not include the current boot image file if the accessed memory includes an old version image file.

As noted above, implementations of the described examples provided above may include hardware, a method or process, and/or computer software on a computer-accessible medium.

ADDITIONAL CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
one or more hardware computer processors; and
one or more non-transitory computer readable storage devices storing software instructions that, when executed by the one or more hardware computer processors, cause the system to:
load an image file into a display buffer;
determine a boot-up stage of the system;
select one of a plurality of sets of gamma table values associated with the boot-up stage, wherein each of the plurality of sets of gamma table values is associated with one of a plurality of boot-up stages including a minimum boot-up stage, a maximum boot-up stage, and at least one boot-up stage between the minimum boot-up stage and the maximum boot-up stage; and
write the one of the plurality of sets of gamma table values to gamma table storage associated with the display buffer, wherein the system is configured to render, on a display of the system, the image file as adjusted by the gamma table values in the gamma table storage.

2. The system of claim 1, wherein the plurality of sets of gamma table values includes at least 10 sets of gamma table values associated with a corresponding at least 10 boot-up stages.

3. The system of claim 1, wherein the image file includes:
a first set of pixels associated with a static image, each of the first set of pixels having pixel values in a first range, and
a second set of pixels associated with a progress bar, each of the second set of pixels having pixel values in a second range that does not overlap with the first range.

4. The system of claim 3, wherein the first range is 0-63 and the second range is 64-255.

5. The system of claim 3, wherein the gamma table values associated with the first range of pixel values are same for each boot-up stage, and the gamma table values associated with at least some pixel values of the second range of pixel values change for corresponding boot-up stages.

6. The system of claim 3, wherein the gamma table values associated with the first range of pixel values are same in each of the plurality of sets of gamma table values, and the gamma table values associated with at least some pixel values of the second range of pixel values change in different sets of the gamma table values.

7. A system comprising:
one or more hardware computer processors; and
one or more non-transitory computer readable storage devices storing software instructions that, when executed by the one or more hardware computer processors, cause the system to:
for each pixel value of a static image, interpolate the pixel value to a first range of values to generate first interpolated pixel values;
for each of a plurality of stages of a boot-up process:
determine pixel values corresponding to an image depicting the stage of the boot-up process;
for each of the pixel values, threshold the pixel value, to one bit to generate thresholded pixel values;
select an encoded multiplier of a plurality of encoded multipliers that is associated with the stage of the boot-up process, wherein each of the plurality of encoded multipliers is within a second range of values that is non-overlapping with the first range of values;
multiply each of the thresholded pixel values by the encoded multiplier to calculate encoded pixel values for the stage of the boot-up process;
sequentially overlay the encoded pixel values for the plurality of stages of the boot-up process to generate first composite encoded pixel values; and
generate an image file including the first interpolated pixel values associated with the static image and the first composite encoded pixel values associated with stages of the boot-up process.

8. The system of claim 7, wherein the instructions, when executed by the one or more hardware computer processors, cause the system to:
for each pixel value of a second static image, interpolate the pixel value to the first range of values to generate second interpolated pixel values;
for each stage of the plurality of stages of the boot-up process:
determine pixel values corresponding to a second image of a plurality of images depicting the stage of the boot-up process;
for each of the pixel values, threshold the pixel value to one bit, to generate thresholded pixel values;
select an encoded multiplier of the plurality of encoded multipliers that is associated with the stage of the boot-up process, wherein each of the plurality of encoded multipliers is within the second range of values that is non-overlapping with the first range of values;
multiply each of the thresholded pixel values by the encoded multiplier to calculate second encoded pixel values for the stage of the boot-up process; and
sequentially overlay the second encoded pixel values for the plurality of stages of the boot-up process to generate second composite encoded pixel values,
wherein the image file further includes the second interpolated pixel values associated with the second static image and the second composite encoded pixel values associated with stages of the boot-up process.

9. The system of claim 8, wherein the first interpolated pixel values and the first composite encoded pixel values are configured for rendering on a left portion of a display and the second interpolated pixel values and the second composite encoded pixel values are configured for rendering on a right portion of the display.

10. The system of claim 7, wherein the thresholded pixel values are each either zero or one.

11. The system of claim 7, wherein the instructions, when executed by the one or more hardware computer processors, cause the system to:
for each of the stages of the boot-up process, generate one or more gamma table values associated with a corresponding one or more encoded pixel values for that stage of the boot-up process.

12. The system of claim 7, wherein the instructions, when executed by the one or more hardware computer processors, cause the system to:
generate gamma table values associated with the first interpolated pixel values, wherein the gamma table values are usable to determine pixel values of the static image prior to interpolating the pixel values.

13. The system of claim 11, wherein the instructions, when executed by the one or more hardware computer processors, cause the system to:
load the image file into a display buffer;
periodically determine a current stage of a boot-up process;
select gamma table values associated with the current stage; and
store the gamma table values to gamma table storage associated with a display, wherein the display is configured to render the image file as adjusted by the gamma table values to render a boot-up image.

14. A system comprising:
one or more hardware computer processors; and
one or more non-transitory computer readable storage devices storing software instructions that, when executed by the one or more hardware computer processors, cause the system to:
load an image file;
render the image file on a display of the system;
while the image file is rendered on the display of the system:
obtain system properties;
determine whether the system properties have changed from a previous boot-up process; and
if the system properties have changed, apply one or more geometric transformations to the image file to generate an adjusted image file and storing the adjusted image file for use by a next boot-up process.

15. The system of claim 14, wherein the system properties include one or more of extrinsic or intrinsic properties of the system.

16. A system comprising:
one or more hardware computer processors; and
one or more non-transitory computer readable storage devices storing software instructions that, when executed by the one or more hardware computer processors, cause the system to:
access memory configured to store a boot image file;
determine that the accessed memory does not include a current boot image file;
in response to determining that the accessed memory does not include the current boot image file, generate, by a graphics pipeline, the boot image file at least partially concurrent to execution of a boot-up process; and
turn, by the graphics pipeline, a three-dimensional scene in an application into a video or image file that is displayed on a display of the system.

17. The system of claim 16, wherein the accessed memory is determined to not include the current boot image file if the accessed memory does not include an image file.

18. The system of claim 16, wherein the accessed memory is determined to not include the current boot image file if the accessed memory includes an old version image file.

* * * * *